Patented July 11, 1933

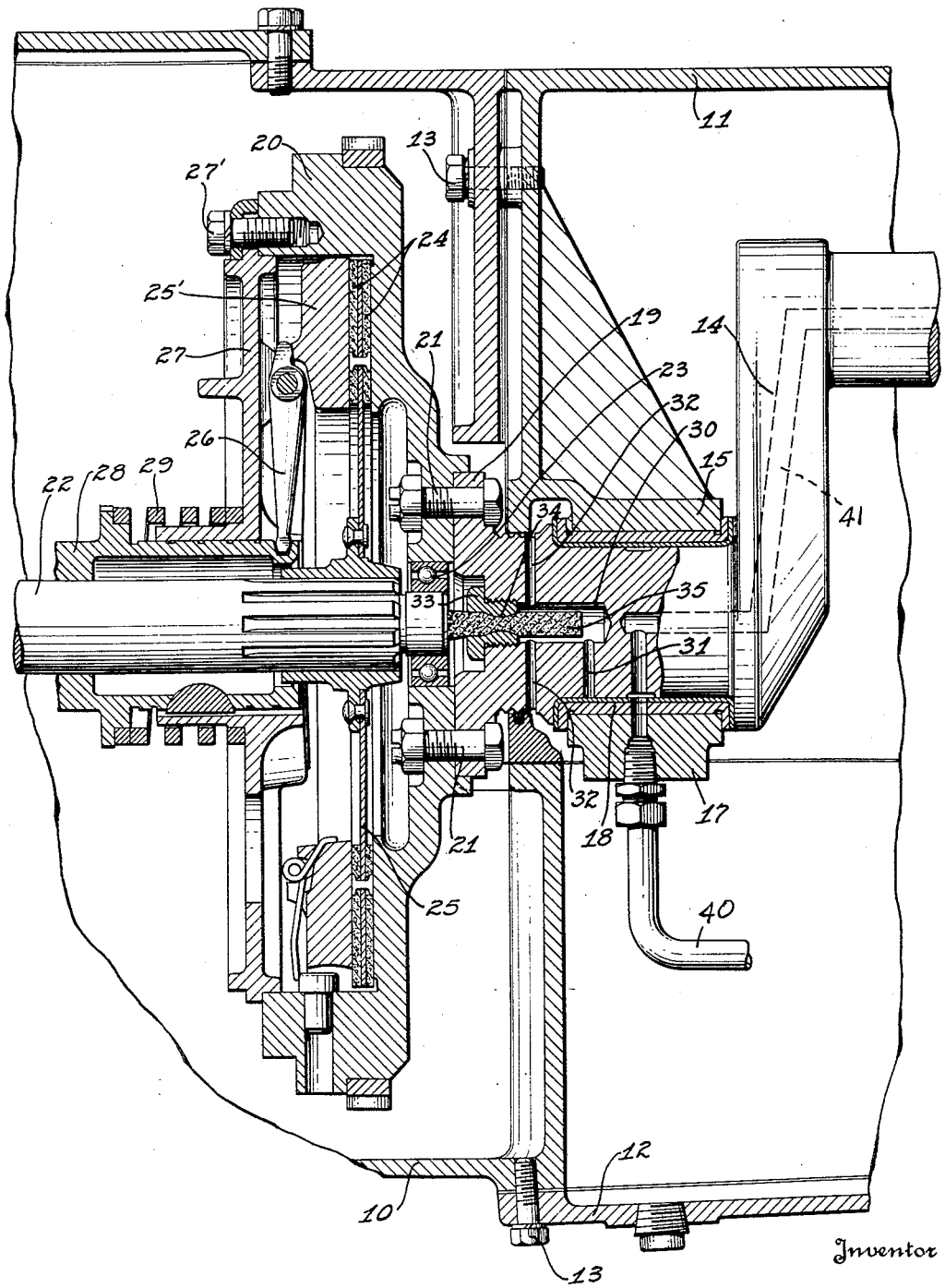

1,917,584

UNITED STATES PATENT OFFICE

JAMES G. HEASLET, OF SHAKER HEIGHTS, OHIO, ASSIGNOR TO THE CLEVELAND TRACTOR COMPANY, OF CLEVELAND, OHIO, A CORPORATION OF OHIO

LUBRICATING MEANS

Application filed January 24, 1930. Serial No. 423,119.

This invention relates to engine propelled devices, and more particularly to lubricating means for the front bearing of a driving shaft.

The front end of the driving shaft of tractors and motor vehicles is usually mounted close to the rear end of the crank shaft and immediately enclosed by the flywheel and clutch. In addition to the inaccessibility caused by such surrounding structures, there is an enclosing casing, and consequently periodic lubrication from the exterior of the casing is rather difficult. It has also been proposed to lubricate this bearing through direct communication with the engine lubricating system, but the excessive lubricant delivered to the bearing in this manner is objectionable because of flooding the adjacent elements.

An object of my invention is to provide an automatic lubrication of the front bearing of a propelled shaft which eliminates flooding of the adjacent elements.

Another object of the invention is to supply the front bearing of the propelled shaft of an engine propelled device with a limited quantity of lubricant which is moved thereto from the engine crank shaft bearing lubricating system.

A further object of the invention is to supply lubricant to the front bearing of a propelled shaft through wicking which is moistened with oil from the crank case of the engine.

The invention with other objects and advantages thereof, and the particular construction, combination and arrangement of parts comprising the same will be understood from the hereinafter contained description, when considered in connection with the accompanying drawing forming part thereof, and illustrating one embodiment of the invention.

In the drawing, I have shown a fragmentary portion of a tractor in section having my invention associated with the crank shaft and the propelled shaft.

Referring now to the drawing by characters of reference, 10 designates the front end of a transmission case which is associated with the rear end of the crank case, formed of sections 11 and 12, by the bolts 13. Extending longitudinally through the crank case is a crank shaft 14, the rear end of which is mounted in the bearing consisting of a section 15, integral with the rear wall of the crank case, and a detachable section 17, such sections being secured together in the usual manner. A sectional bushing 18 surrounds the portion of the shaft extending through the bearing, such bearing and bushing being arranged so that lubricant will travel interiorly of the bushing from the conduit 40 of the engine pressure lubricating system (not shown) which leads to the main lubricant passage 41 in the crank shaft.

The rear end of the crank shaft projects through the partition wall formed by the rear end of the crank case and the front end of the transmission case, and terminates in a flange 19 to which the flywheel 20 is secured by bolts 21. Extending longitudinally in the transmission case is a propelled shaft 22, the forward end of which is mounted in the bearing 23 carried within an aperture in the central portion of the flywheel. The friction elements 24 of a clutch are secured to the carrier 25' which is slidably splined on the propelled shaft at the rear of the bearing 23. A disk 25 is arranged to control the relation of the friction elements with the flywheel, and arms 26, which are pivoted to the plate 27 which is fixed to the flywheel by the cap screws 27'; are operated by the sleeve 28; a spring 29 normally actuating the sleeve to cause engagement of the friction elements with the flywheel to transmit rotation from the flywheel to the propelled shaft.

It will be seen that the bearing 23 is enclosed by the flywheel and clutch structure and is inaccessible for lubrication from the exterior of the surrounding structures and transmission case without detachment. The present splash and pressure lubrication systems connected directly with the front bearing will overflow upon the surrounding clutch elements and is very objectionable, and it is the purpose of this invention to utilize lubricant from the crank case to constantly lubricate the bearing automatically, a limited amount, without flooding.

To this end I provide a central passage 30 which extends axially into the rear end of the crank shaft a distance partially into the rear crankshaft bearing. Communicating with the passage 30 is an oil inlet passage 31 which communicates with the conduit 40, interiorly of the sectional bearing 18 and transversely extending overflow passages 32 establish communication between 30 and the crank case, to the rear of the passage 31. A plug 33 is screwed into the passage 30 at the rear end of the crank shaft, and a bore or passage 34 constricted intermediate its ends extends axially through the plug for the reception of wicking 35, one end of which abuts the front end of the propelled shaft and the other end of which extends into the passage 30.

The wicking is compressed in the constricted portion of the passage 34, and the oil flow by capillary action through the passage will therefore be retarded so that the end of the propelled shaft is constantly moistened only to a degree sufficient to cover the end of the shaft in the bearing 23 with a thin coating of lubricant. Oil in excess of that required to moisten the wicking will be thrown back into the crank case from the passage 30 through the passages 32 by centrifugal force when the engine is operating, and in this manner the wicking is not caused to absorb more oil than is required for coating the front propelled shaft bearing 23 with lubricant. The oil passing through the wicking will spread around the front end of the propelled shaft.

It will be seen that I have provided a simple automatic system for constantly lubricating the front propelled shaft bearing which will not flood the surrounding elements, and that the bearing will never become dry except possibly when there are exceptionally long lapses between operations of the engine and then the dry period will be of very short duration.

While I have shown and described the preferred embodiment of the invention, it should be understood that I reserve the right to make such changes in the form, construction and arrangement of parts as will not depart from the spirit of the invention or the scope of the claims.

What is claimed is:—

1. In a power transmitting mechanism, a crank shaft having a passage extending axially through the rear end thereof, a pressure lubricating system for the crank shaft connected with the passage in the crank shaft, a propelled shaft mounted with an end adjacent the rear end of the crank shaft, and wicking projecting from the crank shaft passage conducting oil to the end of the propelled shaft, said rear shaft end having relief passages extending radially from the axial passage through which excess oil in the axial passage is thrown by centrifugal force during rotation of the crank shaft.

2. In a power transmitting mechanism, a crank shaft having an axial passage in one end thereof, a plug in the end of the passage in the crank shaft having an axially extending bore constricted intermediate its ends, a crank shaft lubricating system with which the crank shaft passage communicates, a propelled shaft mounted with one end adjacent the plug, and wicking extending through the passage in the plug and abutting the end of the propelled shaft.

3. In a power transmitting mechanism, a crank shaft having an axial passage in one end thereof, a removable plug secured in the end of the passage in the crank shaft, a crank shaft lubricating system communicating with the passage in the crank shaft, a propelled shaft having one end adjacent the plug, and wicking carried by and extending through the plug against the end of the propelled shaft.

4. In a power transmitting mechanism, a crank shaft having one end formed with an axially extending passage and a plurality of transverse passages communicating with the axial passage, said passages communicating with the lubricating system for the crank shaft, a lubricating system for the crank shaft connected with the axial passage, a propelled shaft mounted with one end adjacent the end of the crank shaft with the passages therein, and a wicking in the axial passage in the crank shaft abutting the adjacent end of the propelled shaft, the rotation of the crank shaft throwing excess oil out of the axial passage through the transverse passages.

5. In a power transmitting mechanism, a crank shaft having a passage in one end thereof, a crank shaft lubricating system communicating with the passage in the crank shaft, a propelled shaft mounted in one end adjacent the end of the crank shaft with the passage therein, and a wicking in the crank shaft passage abutting the end of the propelled shaft, said shaft having oil relief passages therein, in direct communication with and intermediate the ends of the wicking.

6. In a power transmitting mechanism, a crank shaft having a restricted axial passage in one end, bearings for the crank shaft, means for lubricating the crank shaft bearings, a propelled shaft having one end mounted adjacent but spaced from the end of the crank shaft with the passage therein, and wicking arranged in and projecting from the restricted passage to conduct a metered quantity of lubricant from the crank shaft bearing lubricating means to the end of the propelled shaft mounted adjacent the crank shaft.

In testimony whereof, I have hereunto affixed my signature this 21st day of January, 1930.

JAMES G. HEASLET.